United States Patent [19]

Senda

[11] Patent Number: 5,795,112
[45] Date of Patent: Aug. 18, 1998

[54] METHOD FOR COMPENSATING A COMPONENT OF A MACHINE TOOL FOR DISPLACEMENT CAUSED BY HEAT

[75] Inventor: Harumitsu Senda, Aichi-ken, Japan

[73] Assignee: Okuma Corporation, Aichi-pref., Japan

[21] Appl. No.: 710,781

[22] Filed: Sep. 20, 1996

[30] Foreign Application Priority Data

Sep. 22, 1995 [JP] Japan ................... 7-244708

[51] Int. Cl.$^6$ .................. B23B 35/00; B23Q 15/18
[52] U.S. Cl. .................. 409/131; 409/193; 409/239; 408/13
[58] Field of Search .................. 408/13; 409/131, 409/135, 136, 193, 238, 239, 186

[56] References Cited

U.S. PATENT DOCUMENTS

| | | | |
|---|---|---|---|
| 3,735,157 | 5/1973 | Whetham | 409/239 X |
| 4,919,575 | 4/1990 | Yoshimi et al. | 408/13 X |
| 5,303,458 | 4/1994 | Sheehan et al. | 409/135 X |
| 5,332,340 | 7/1994 | Pumphrey | 408/13 X |
| 5,387,061 | 2/1995 | Barkman et al. | 409/135 X |

FOREIGN PATENT DOCUMENTS

| | | | |
|---|---|---|---|
| 0094960 | 6/1983 | Japan | 409/238 |
| 61-59860 | 12/1984 | Japan . | |
| 0295743 | 11/1989 | Japan | 409/238 |
| 404372328 | 12/1992 | Japan | 409/135 |
| 6-22779 | 3/1994 | Japan . | |

Primary Examiner—Daniel W. Howell
Assistant Examiner—Henry W. H. Tsai
Attorney, Agent, or Firm—Lahive & Cockfield, LLP

[57] ABSTRACT

A temperature measuring device measures the temperature of a main shaft as a numerical value based on the outputs from temperature sensors. A temperature recorder stores the value as time series data. When the heat-induced displacement of the main shaft is in a stationary state, a heat-induced displacement estimate computing unit estimates the displacement based on the instantaneous temperature measurement. When the displacement is in a transient state due to a change in the rotation speed of the main shaft, the computing unit estimates the heat-induced displacement of the main shaft by multiplying the elapsed time from the beginning of the transient state by the ratio of the heat-induced displacement time constant to the temperature time constant and estimating the heat-induced displacement based on the time series data of the time preceding the current time by the result of the multiplication.

9 Claims, 9 Drawing Sheets

METHOD FOR COMPENSATING A COMPONENT OF A MACHINE TOOL FOR DISPLACEMENT CAUSED BY HEAT

BACKGROUND OF THE INVENTION

1. Field of the Invention

The present invention relates to a method for compensating components of a machine tool for displacement caused by heat (or heat-induced displacement). The present invention relates more particularly to a heat-induced displacement compensation method applied to a machine tool when the heat-induced displacement of its components is in a transient state due to a change in operating condition rather than a method applied to a machine tool when the temperature and therefore component displacement is in a constant, or in a stationary state.

2. Description of the Prior Art

Generally, due to its mechanical nature, a machine tool has several heat sources, such as the roller bearings of the main shaft. Heat generated from such sources is conducted to other parts of the machine tool, causing heat distortion of mechanical components. Since such heat distortion greatly affects the accuracy of machining, various methods of compensating for this heat distortion have been proposed.

One such example is disclosed in Japanese Published Examined Patent Application No. S61-59860. This method includes the steps of measuring the current temperature of a machine tool with one sensor attached to the head of the main shaft and another attached to the body of the machine tool, estimating the displacement of the mechanical components using a function, stored in program memory, for the heat-induced displacement of the main shaft based on the instantaneous value representative of the temperature measurement, and compensating the main shaft accordingly.

As an another example, Japanese Published Examined Patent Application No. H6-22779 discloses a method of more accurately estimating component displacement caused by heat. The method includes the steps of obtaining the displacements of different components, estimating the displacement of the main shaft based on the combination of the displacements, and compensating the main shaft due to the displacement.

It is well known that the time responses of a temperature difference and heat distortion can be expressed by first-order lag elements. Accordingly, the displacement of the main shaft due to rotation can be considered a step response to the rotation speed. The time responses of temperature difference and resulting heat-induced displacement can be expressed as follows:

$$\text{Temperature difference: } TMP(t)=Q\{1-\exp(-t/a)\} \qquad (1)$$

$$\text{Heat-induced displacement: } \delta(t)=K\{1-\exp(-t/b)\} \qquad (2)$$

where a=temperature time constant, b=heat-induced displacement time constant, and t=time.

It is also well known that when the displacement of a machine tool is in a stationary state, in which the temperature is stabilized, a relationship that can be expressed as follows exists between the temperature difference (the difference between the temperature of the main shaft and that of the bed or the ambient temperature) and heat-induced displacement:

$$\text{Heat-induced displacement}=\alpha \times \text{temperature difference} \qquad (3)$$

where $\alpha$ is a constant. Based on expressions (1)–(3), it therefore follows that:

$$\delta(t)=\alpha \times TMP(t)=(K/Q) \times TMP(t) \qquad (4)$$

Expression (4) shows that a heat-induced displacement is given by multiplying the temperature by enlargement ratio $\alpha$ or K/Q. Therefore, the temperature and the heat-induced displacement can be considered first-order lag elements that converge on the same value as time, (t), goes to infinity.

Thus, the conventional method by which the heat-induced displacement of a main shaft is estimated based on an instantaneous temperature measurement of the main shaft can closely approximate the actual displacement in a stationary state, in which the temperature is stabilized.

FIG. 17 shows the step responses of the first-order lag elements of temperature and heat-induced displacement in a transient state due to a change in the rotation speed of the main shaft. The step responses are expressed as simplifications of expressions (1) and (2):

$$\text{Temperature difference: } TMP(t)=1-\exp(-t/a) \qquad (5)$$

$$\text{Heat-induced displacement: } \delta(t)=1-\exp(-t/b) \qquad (6)$$

As shown in FIG. 17, TMP(t) no longer coincides with $\delta(t)$ due to the difference between temperature time constant, a, and heat-induced displacement time constant, b. Therefore, a compensation error corresponding to TMP(t)–$\delta(t)$ will occur if the conventional method of estimating the heat-induced displacement based on the instantaneous temperature measurement is applied to estimation of displacement in a transient state, in which the temperature is undergoing change.

SUMMARY OF THE INVENTION

One object of this invention is to provide a method of accurately compensating a machine tool for heat-induced displacement not only in a stationary state but also in a transient state by applying a separate, special process to estimating the transient heat-induced displacement.

The above and other related objects are attained by the present invention, which provides a method of compensating a component of a machine tool for heat-induced displacement, comprising the steps of:

measuring the temperature of a component of a machine tool subject to heat deformation based on the output of at least one temperature sensor;

estimating the heat-induced displacement of the component based on an instantaneous temperature measurement when the heat-induced displacement is in a stationary state, in which the temperature of the component is stabilized, and estimating the heat-induced displacement based on a value that changes with time when the heat-induced displacement is in a transient state due to a change in the operating condition of the machine tool; and compensating for the heat-induced displacement of the machine tool based on the estimate.

By this method of compensating a component of a machine tool for heat-induced displacement, the temperature of a machine tool component where heat distortion occurs is first measured based on the output of at least one temperature sensor. Secondly, the heat-induced displacement based on the instantaneous temperature measurement is estimated the displacement is in a stationary state and the temperature is stabilized. Thirdly, if the heat-induced displacement is in a transient state, it is estimated based on a value that changes with time. Therefore, the heat-induced displacement of the machine tool can be accurately compensated for based on the estimate regardless of the state of the displacement. Preferably, such compensation is performed by a numerical control device.

Besides the main shaft, parts that significantly affect the accuracy of finishing of work if heat distortion occurs include the saddle and the feed rod of the column.

Another method of compensating a component of a machine tool for heat-induced displacement according to the invention comprises the steps of:

measuring the temperatures of components of a machine tool subject to based on the output of at least one temperature sensor;

storing the temperature measurement as time series data;

estimating the heat-induced displacement of the component based on an instantaneous temperature measurement when the displacement is in a stationary state and the temperature is stabilized, and estimating the heat-induced displacement based on the time series data of the time which precedes the current time by the result of multiplication of the elapsed time by the ratio of the heat-induced displacement time constant to the temperature time constant when the heat-induced displacement is in a transient state due to a change in the operating condition of the machine tool; and compensating for the heat-induced displacement of the machine tool based on the estimate.

By this method, the heat-induced displacement in a transient state is estimated based on the ratio of the heat-induced displacement time constant to the temperature time constant as follows: If an operating condition of a machine tool such as the rotation speed of the main shaft changes when the displacement is in a stationary state, a transient state is initiated, in which the temperature and the heat-induced displacement of the machine tool change according to the response curves shown in FIG. 1. From this diagram it can be seen that during the transient state, the temperature achieves an amount of change, D1, at time (t)=t1, and the displacement achieves D1 at time (t)=t2, as shown in expressions (5) and (6) below.

$$\text{Temperature difference: } D1=TMP(t1)=1-\exp(-t1/a) \quad (5')$$

$$\text{Heat-induced displacement: } D1=\delta(t2)=1-\exp(-t2/b) \quad (6')$$

Thus, $$TMP(t1)=\delta(t2). \quad (7)$$

The following is established based on the above:

$$t1=(a/b)t2 \quad (8)$$

Expression (8) shows how to accurately estimate heat-induced displacement, which has a greater time constant, based on temperature difference, which has a smaller time constant. That is, the heat-induced displacement at time t2 can be estimated based on the temperature measured at time $\{t2-(a/b)t2\}$ (the temperature measured at the time preceding time t2 by the time period obtained by multiplying the elapsed time from the beginning of the transient state by the time constant ratio of a/b). Using this ratio is convenient in data processing because it is a fixed value.

If certain operating conditions of the machine tool, such as the rotation speed of the main shaft, change when displacement is already in a transient state, the temperature difference and the heat-induced displacement change according to the response curves shown in FIG. 2. In this case, the reference time of the estimation is updated to time t0, when the change occurred. Such updating, however, causes a data gap at time t0. If the above-described estimating process for a transient state is applied with no adjustment, the estimate will be inaccurate due to the resulting estimation error.

Accordingly, as a further aspect of the present invention, a method of compensating for this estimation error is provided by which heat-induced displacement is accurately estimated, even if the rotation speed of the main shaft changes in a transient state.

If the above-described process for estimating heat-induced displacement in a transient state is applied with the reference time updated to time t0, the error curve between the actual heat-induced displacement and the estimated heat-induced displacement will be a free response of a first-order lag whose time constant equals that of the heat-induced displacement change as shown in FIG. 2. In order to compensate for the estimation error caused by a change in the rotation speed when the displacement is already in a transient state, it is necessary to calculate the gap correction value that freely responds to gap e at updated reference time t0. Therefore, an accurately estimated heat-induced displacement due to a change in the rotation speed is given by the following expression:

$$\text{Estimated heat-induced displacement=Estimate by transient state process+gap correction value} \quad (9)$$

Data gap ε, since it is brought about by the change in the reference time due to a rotation speed change, can be calculated based on temperature TMP (t0), at which the change occurred. If so, the gap ε is given by the following expression:

$$\epsilon=TMP(t0)-TMP[(a/b)\times t0] \quad (10)$$

where "a" is the temperature time constant, "b" is the heat-induced displacement time constant, and "t0" is the time at which the change in the rotation speed occurred. Also, the free response of a first-order lag can be expressed as follows:

$$Ue(t)=\epsilon\times\exp(-t/a) \quad (11)$$

This invention provides still another method of compensating for heat-induced displacement of machine tool components.

This method includes the steps of:

measuring the temperature of a component of a machine tool subject to based on the output of at least one temperature sensor;

estimating the heat-induced displacement of the component based on an instantaneous temperature measurement when the heat-induced displacement is in a stationary state and the temperature is stabilized, and estimating the heat-induced displacement based on a time response expression containing a heat-induced displacement convergent value corresponding to the command rotation speed of the component, the heat-induced displacement convergent value having been stored in advance; and compensating for the heat-induced displacement of the machine tool based on the estimate.

By this method, the relationship between different rotation speeds and the respective heat-induced displacement values in a stationary state is determined before estimation. The relationship is expressed as follows:

$$\text{Heat-induced displacement amount: } \delta N=f(N) \quad (12)$$

where "N" is the rotation speed. This heat-induced displacement is the convergent value of a first-order lag step response. For each rotation speed, the corresponding heat-induced displacement convergent value is stored in memory in advance. When a rotation speed change command is issued, the heat-induced displacement convergent value corresponding to the command rotation speed is read from memory. The transient heat-induced displacement amount is given by the following time response expression based on convergent value & N and heat-induced displacement $\delta 0$, which is the heat-induced displacement amount before the rotation speed change:

Heat-induced displacement amount:

$$\delta(t) = |\delta N - \delta 0| \times \{1 - \exp(-t/b)\} + \delta 0 \qquad (13)$$

The present invention also provides a method of switching between the heat-induced displacement estimating process for a stationary state and the heat-induced displacement estimating process for a transient state. According to this method, the switch between the two processes is carried out when the heat-induced displacement estimate is substantially the same as the heat-induced displacement convergent value.

A method of gradually and smoothly switching between the aforementioned two processes is also provided as another aspect of this invention. By this method, during a predetermined period of time, the heat-induced displacement amount to be compensated for the heat-induced displacement is obtained by mixing the heat-induced displacement estimates by the two processes at a ratio which so varies with time that, as the heat-induced displacement amount estimated by the process for a stationary state gradually decreases, so the heat-induced displacement amount estimated by the process for a transient state complementarily increases. At the expiration of the predetermined period of time, the estimate obtained by the process for a stationary state alone is used as the value to compensate for the displacement.

The present invention also provides various methods of switching between the two estimating methods when it is determined that the current heat-induced displacement estimate is substantially the same as the heat-induced displacement convergent value. Such methods (a) to (d) are explained hereinafter.

By method (a), the estimating process applied to a transient state is switched with the estimating process applied to a stationary state at the expiration of a certain period of time from the beginning of the transient state. A step response value of a first-order lag reaches 95% of the convergent value in three times the time period of the time constant, which is fixed regardless of the amount of change. For example, therefore, if a complete switchover is arranged to take place at time t1 as shown in FIG. 3, heat-induced displacement compensation can be effectively performed.

Alternatively, a gradual switchover as shown in FIG. 4 may be employed: During a predetermined period of time between t1 and t2, a heat-induced displacement amount is estimated by mixing the heat-induced displacement estimates by the aforementioned two processes at a ratio which so varies with time that the heat-induced displacement amount estimated by the transient state process gradually decreases with the heat-induced displacement amount estimated by the stationary state process complementarily increasing. At the expiration of the predetermined period of time, the estimate obtained by the process applied to a stationary state alone is used for displacement compensation. This alternative method provides a gradual switchover between the two processes, rather than abruptly switching from one to another. The heat-induced displacement amount by this alternative method is given by the following ratio mixing expression:

Heat-induced displacement amount=$\{(t-t1)/(t2-t1) \times \delta(s)\} + \{(t2-t)/(t2-t1) \times \delta(t)\}$ (14)

where $\delta(t)$ is the estimate by the process for a transient state and $\delta(s)$ is the estimate by the process for a stationary state.

FIG. 5 is a graph showing method (b), which includes the steps of monitoring the rate of change of the temperature or the heat-induced displacement estimate upon commencement of a transient state, determining that the estimate is substantially the same as the convergent value when the monitored rate exceeds predetermined threshold value V1, and upon such determination, switching from the process applied to a transient state to the process applied to a stationary state.

Alternatively, a gradual switchover as shown in FIG. 6 may be employed: When the monitored value is between threshold values V1 and V2, a heat-induced displacement amount is obtained by mixing the heat-induced displacement estimates by the aforementioned two processes at a ratio which so varies with time that the heat-induced displacement amount estimated by the transient state process gradually decreases with the heat-induced displacement amount estimated by the stationary state process complementarily increasing. When threshold value V2 is reached, the estimate obtained by the process applied to a stationary state alone is used for displacement compensation. This alternative method provides a gradual switchover between the two processes, rather than abruptly switching from one to another.

Method (c) includes the steps of comparing a response value with the convergent value upon commencement of a transient state, determining that the estimate is substantially the same as the convergent value when the difference between the two values exceeds predetermined threshold value V1, and upon such determination, switching from the process applied to a transient state to the process applied to a stationary state (see FIG. 5).

Alternatively, a gradual switchover as shown in FIG. 6 may be adopted: When the monitored value is between threshold values V1 and V2, the heat-induced displacement amount is obtained by mixing the heat-induced displacement estimates by the aforementioned two processes at a ratio which so varies with time that the heat-induced displacement amount estimated by the transient state process gradually decreases with the heat-induced displacement amount estimated by the stationary state process complementarily increasing. When threshold value V2 is reached, the estimate obtained by the process applied to a stationary state alone is used for displacement compensation. This alternative method provides a gradual switchover between the two processes, rather than abruptly switching from one to another.

Method (d) includes the steps of comparing the value estimated by the process applied to a transient state with the value estimated by the process applied to a stationary state upon commencement of a transient state and switching from the process applied to a transient state to the process applied to a stationary state when the difference between the two estimates exceeds a predetermined threshold value,(see FIG. 5). As in methods (a)–(c), the gradual switchover may be also employed in this case (see FIG. 6).

Furthermore, it is possible to combine methods (a)–(d) to suit particular applications. Also, a linear switchover, as shown in FIG. 7, or an arc-tangent switchover, as shown in FIG. 7, can be employed for the gradual switchover.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

Embodiment 1

Figure 1:
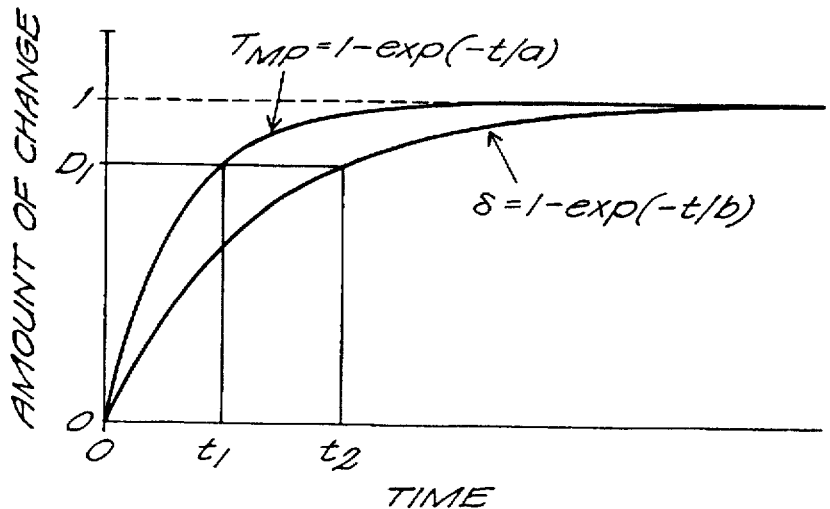
FIG. 1 is a chart showing the time response characteristics of the temperature and the heat-displacement of a component of a machine tool when a transient state occurs.
Figure 2:
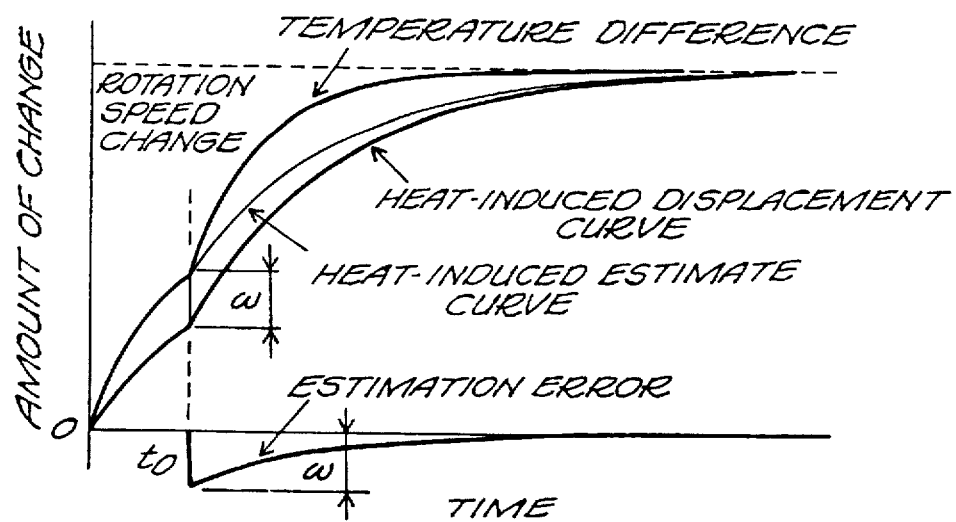
FIG. 2 is a chart showing the time response characteristics of the temperature and the heat-displacement of a main shaft of a machine tool when a rotation speed of the main shaft is changed during the transient state.
Figure 3:
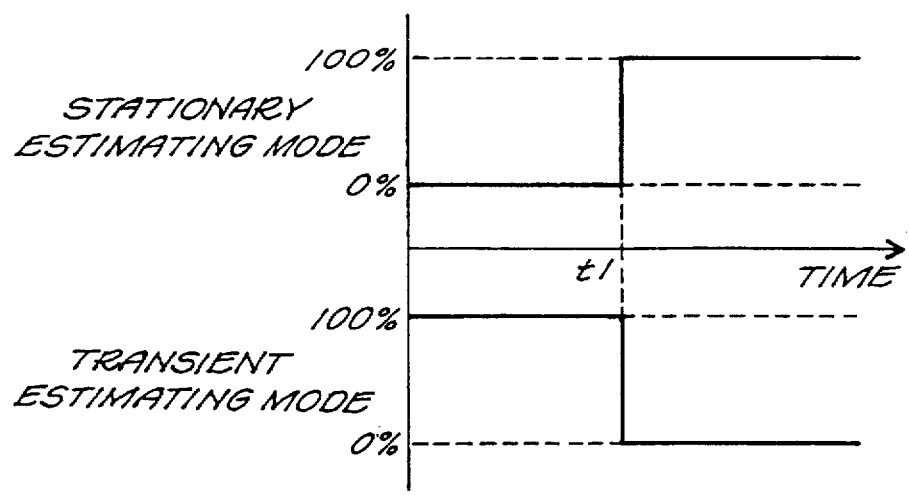
FIG. 3 illustrates a method of instantaneously switching two estimating processes in accordance with the present invention.
Figure 4:
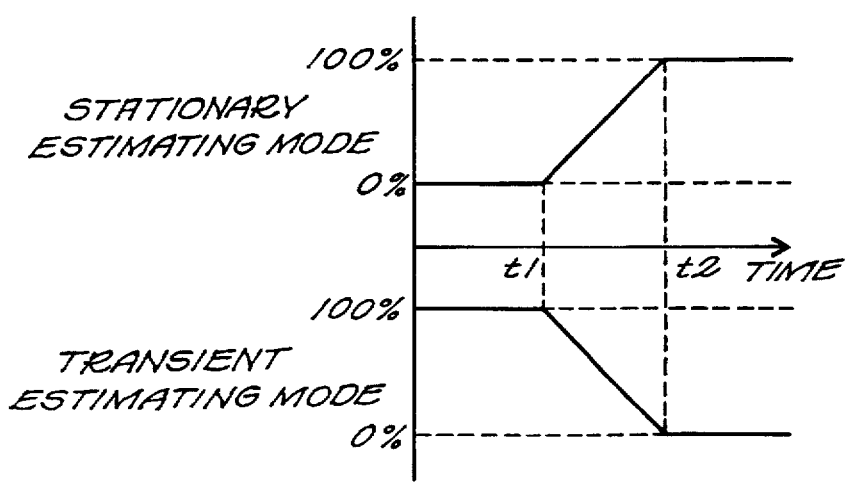
FIG. 4 illustrates a method of gradually switching the two estimating processes of FIG. 3 in accordance with the present invention.
Figure 5:
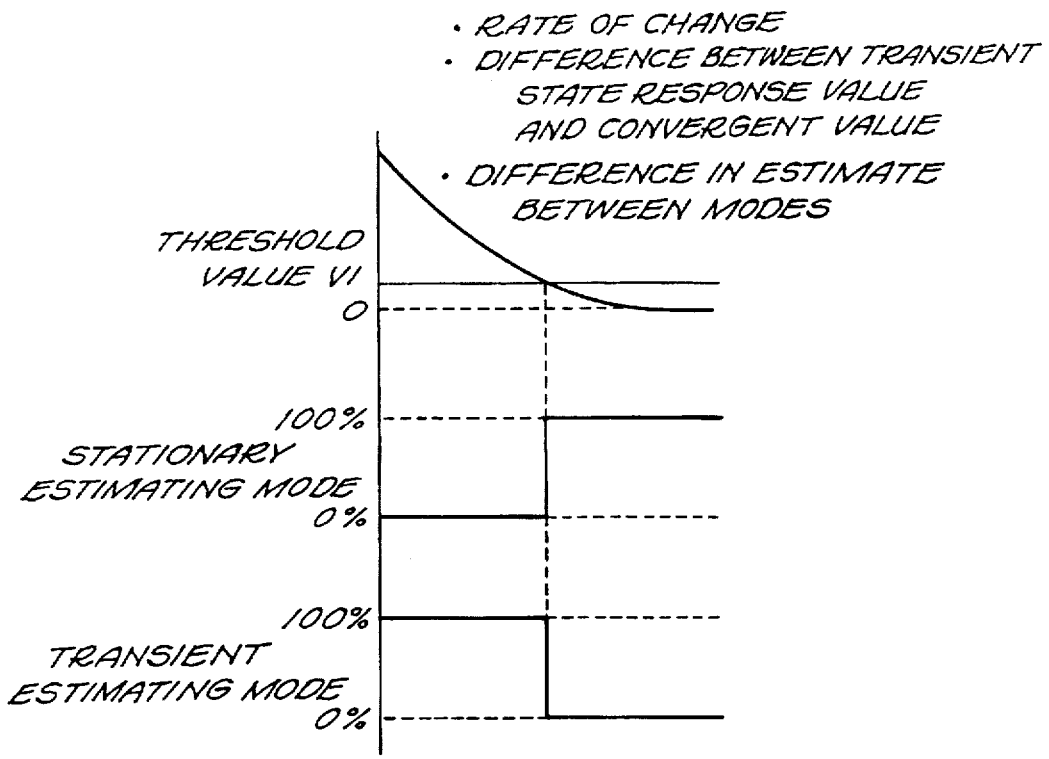
FIG. 5 illustrates another method of instantaneously switching two estimating processes using a predetermined threshold value V1.
Figure 6:
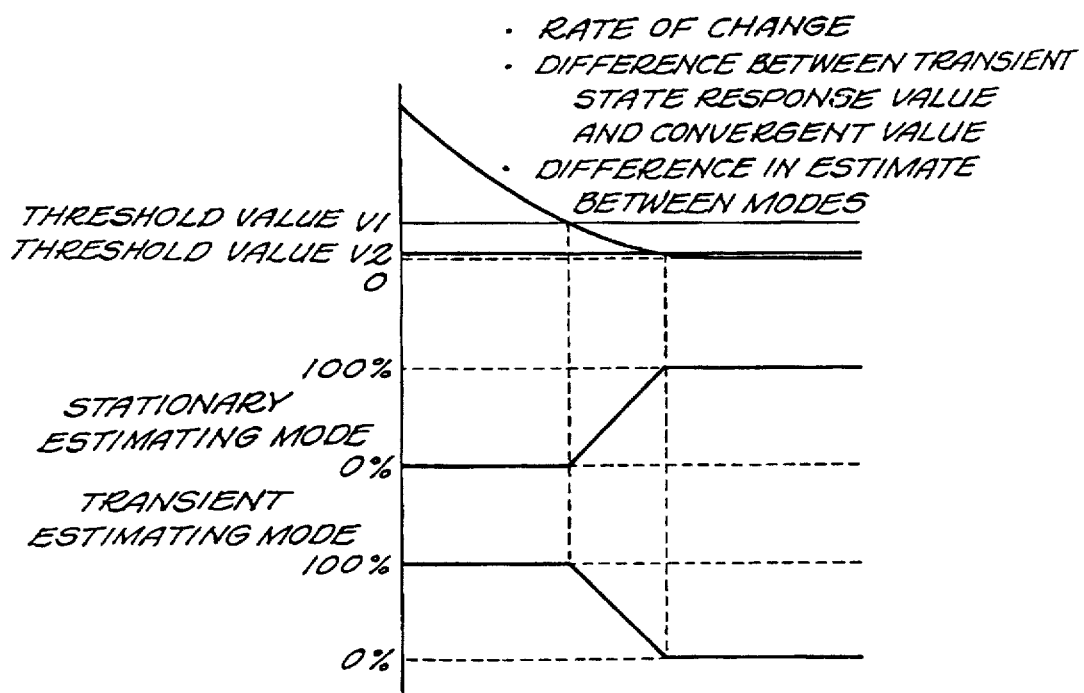
FIG. 6 illustrates another method of gradually switching the two estimating processes using threshold values V1 and V2.
Figure 7:
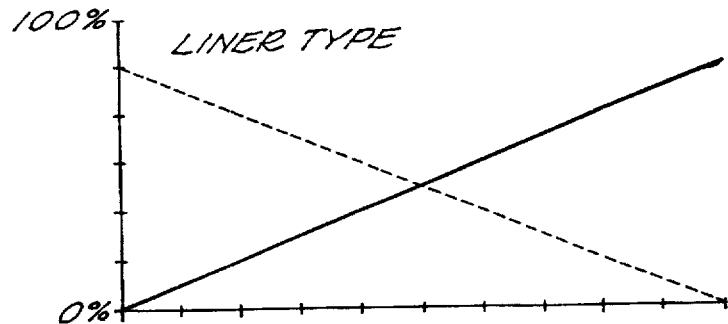
FIG. 7 illustrates a variation of the gradual switching methods of FIGS. 4 and 6.
Figure 8:
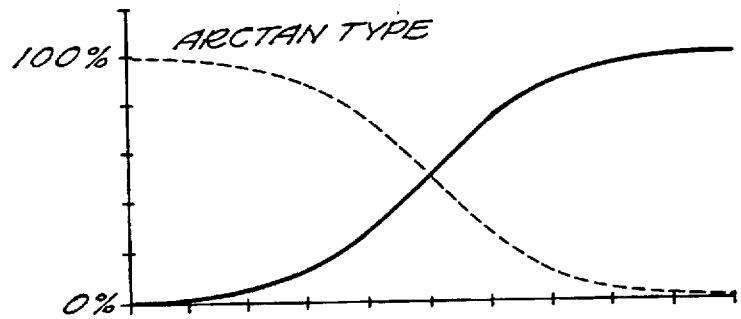
FIG. 8 illustrates another variation of the gradual switching methods of FIGS. 4 and 6.
Figure 9:
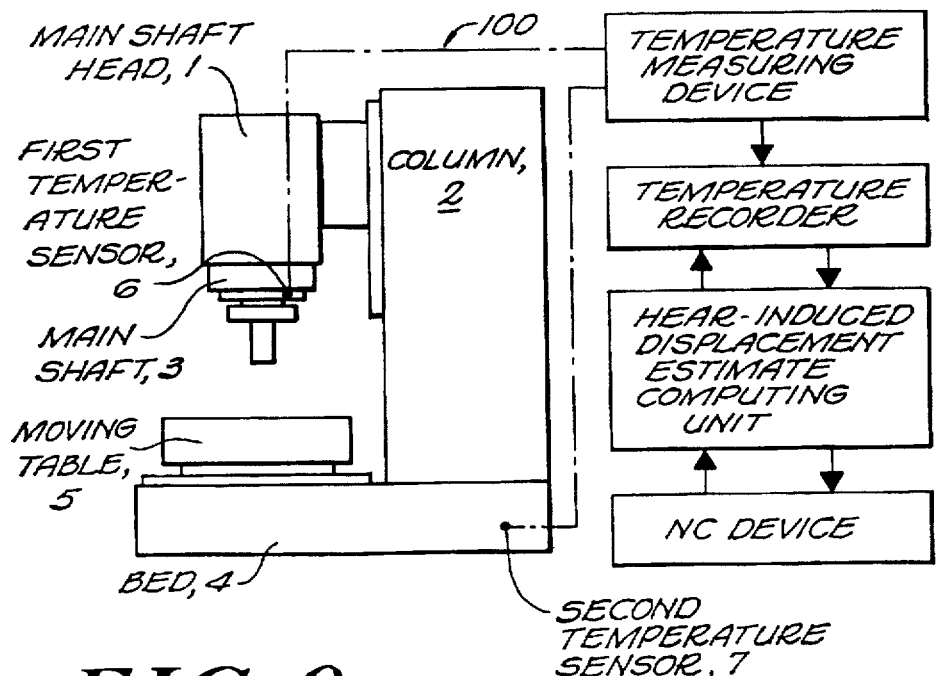
FIG. 9 is a schematic illustration of a heat-induced displacement system for use with a machining center of a first embodiment in accordance with the present invention.

FIGS. 9–13 concerns a method of compensating for heat-induced displacement in a machine tool according to the first embodiment of the present invention. FIG. 9 shows a vertical machining center 100 which includes a main shaft head 1, a column 2, a main shaft 3, a bed 4, and a moving table 5. The machining center 100 also has a first temperature sensor 6 attached to the main shaft 3. The sensor 6 measures the temperature of the main shaft 3, which is subject to heat distortion that affects the machining accuracy of the machining center 100. A second temperature sensor 7 is also attached to the bed 4 for measuring a reference temperature.

Reference numeral 8 designates a temperature measuring device for measuring the temperature of the main shaft 3 as a numeric value based on the outputs from the first and second temperature sensors 6 and 7 by a known method. Measured temperature of the main shaft 3 is stored in a temperature recorder 9 as time series data in association with the measuring time or in a manner which indicates the measuring time. Time series data is erased at the expiration of a certain period of time. Such time series data may be recorded when the heat-induced displacement of the main shaft 3 is in a transient state only. Reference numeral 10 designates a heat-induced displacement estimate computing unit which switches between an estimating mode for a stationary state (referred to as the stationary estimating mode) and an estimating mode for a transient state (referred to as the transient estimating mode), depending on the rotation speed command and the progress of the heat-induced displacement of the main shaft 3, to calculate the heat-induced displacement estimate of the main shaft 3. A numerical control device 11 connected to the computing unit 10 compensates for the heat-induced displacement of the main shaft 3 based on the heat-induced displacement estimate calculated by the computing unit 10. The first and second temperature sensors 6 and 7, the temperature measuring device 8, the temperature recorder 9, the computing unit 10, and the numerical control device 11 constitute a heat-induced displacement compensating system which is also applicable to a horizontal machining center.

In the operation of the machining center 100, the temperature of the main shaft 3 is measured based on the outputs from the temperature sensors 6 and 7. In a stationary state, in which the temperature of the main shaft 3 is stabilized, the heat-induced displacement of the main shaft 3 is estimated by expression (3) based on an instantaneous temperature measurement. If the rotation speed of the main shaft 3 changes, the operation is switched from the stationary estimating mode to the transient estimating mode, in which a special process applied to a transient state is employed to estimate the heat-induced displacement of the main shaft 3.

Figure 10:
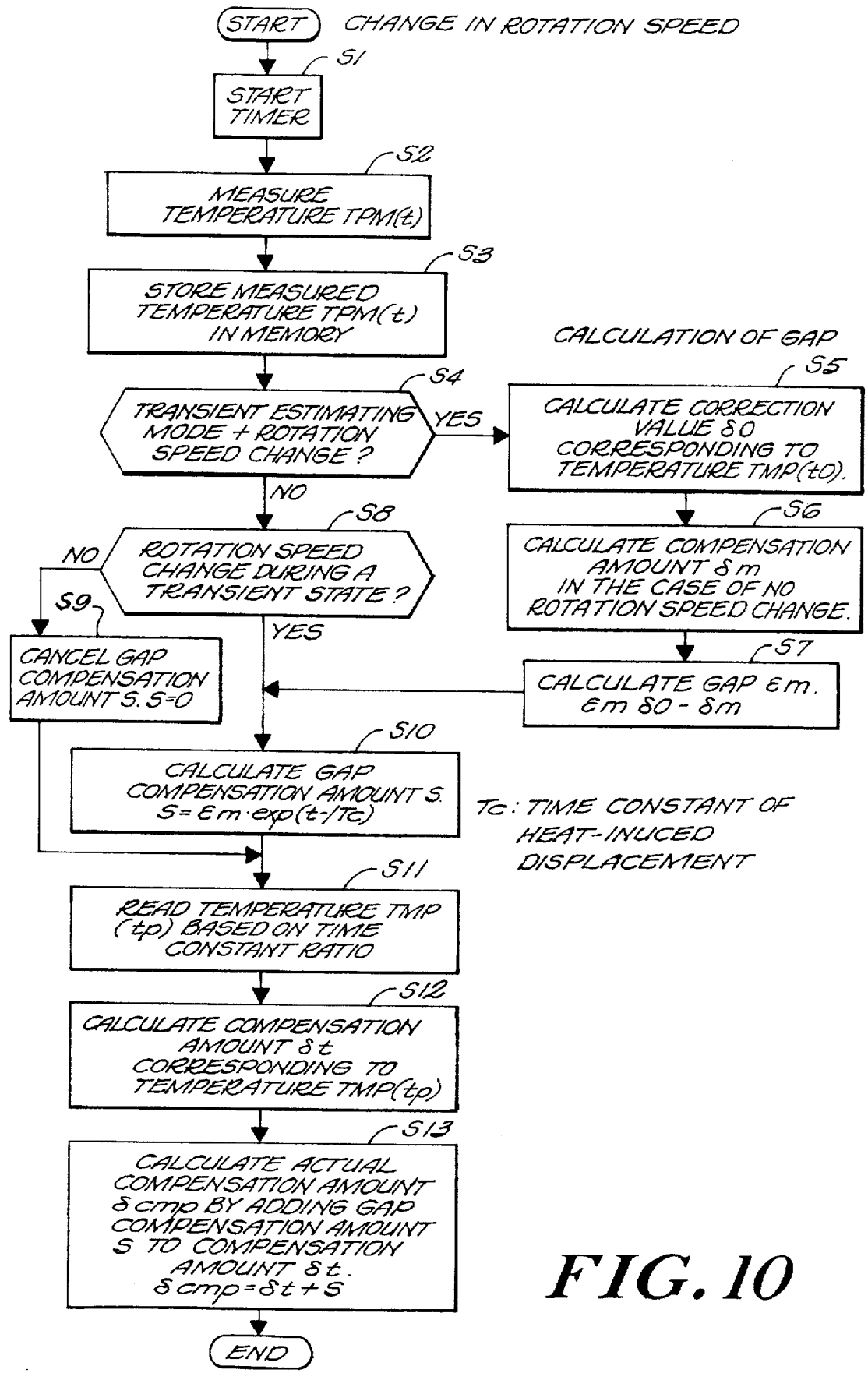
FIG. 10 is a flowchart showing the process carried out by the heat-induced displacement system of FIG. 9.

A flowchart for this special process is shown in FIG. 10 of the drawings. If the rotation speed of the main shaft 3 changes in a stationary state, a transient state estimation program starts. At step S1, a timer starts with the time of the change in the rotation speed as the reference time. After measured at regular intervals at step S2, temperature TMP(t) of the main shaft 3 is stored in the temperature recorder 9 as time series data at step S3. At step S4, it is determined if the rotation speed of the main shaft 3 has changed while the heat-induced displacement is in the transient state. If YES, the program goes on to step S5, at which correction value δ0 corresponding to temperature TMP (t0) is obtained, and at step S6, the correction value which does not reflect the change in the rotation speed is obtained as correction value δm. The program proceeds to step S7, where gap εm due to the rotation speed change is given by expression (10). Then, gap correction value S is given by expression (11) based on the time according to the timer at step S10. At step S11, the time tp preceding the current time by the time period obtained by multiplying the current time by the time constant ratio a/b is given by expression (8) while temperature TMP (tp) corresponding to time tp is read from the temperature recorder 9. At step S12, a compensation amount δt corresponding to temperature TMP (tp) is given by expression (3). If no temperature data measured at time tp exists, the temperature measured at the time closest to time tp is used instead. Alternatively, temperature TMP (tp) may be calculated by proportional interpolation using the data around time tp. At step S13, the actual compensation amount δcmp is given by adding gap correction value S to compensation amount δt. The heat-induced displacement of the main shaft 3 can be accurately compensated for throughout the duration of a transient state by repeating the foregoing steps until the heat-induced displacement is stabilized.

At step S8, it is determined if the rotation speed of the main shaft 3 has changed since the beginning of the transient state. If YES, the program proceeds to step S10. If NO, gap correction value S is canceled at step S9, and the program proceeds to step S11.

Figure 11:
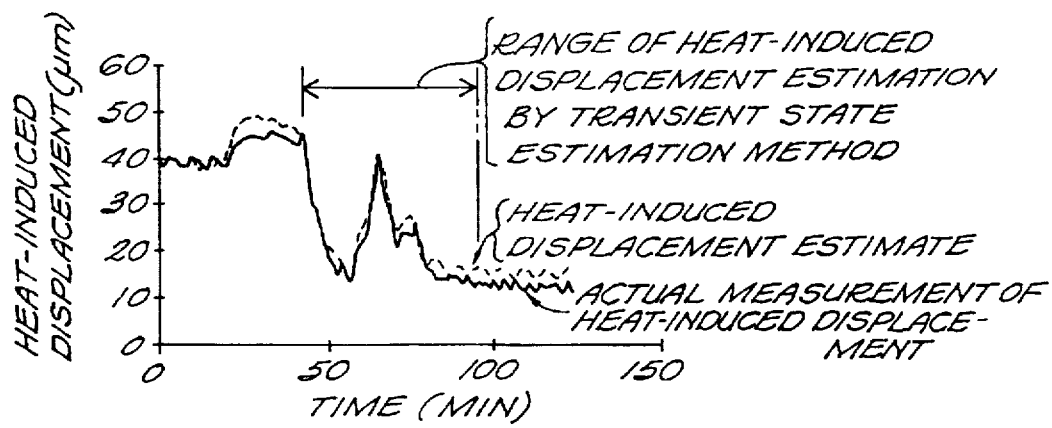
FIG. 11 is a graph comparing the heat-induced displacement of a main shaft of a machining center estimated by the foregoing system with the actually measured heat-induced displacement of the main shaft over time.
Figure 12:
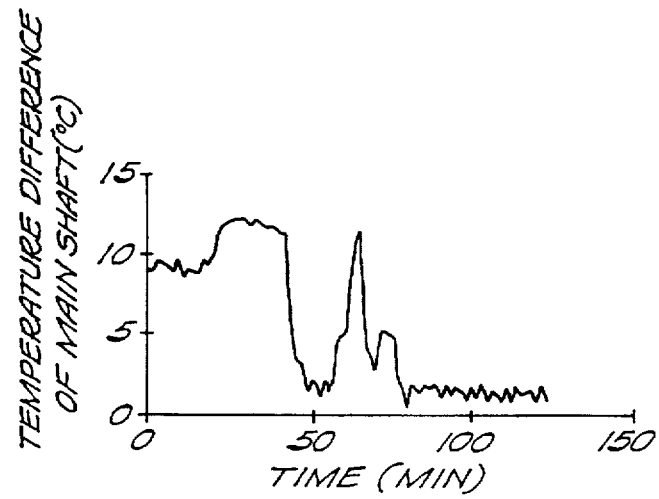
FIG. 12 shows the change in the temperature fluctuation of the main shaft of FIG. 11.
Figure 13:
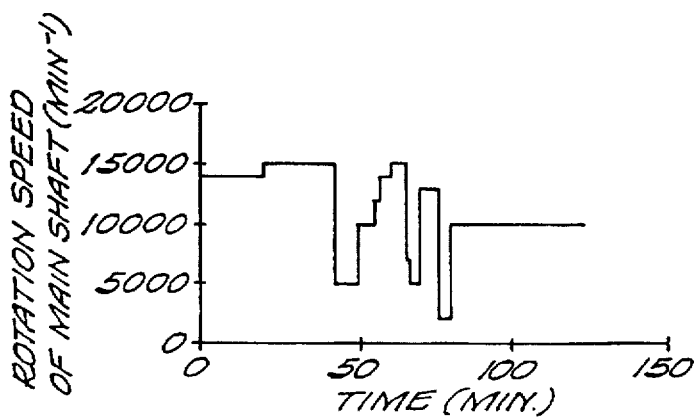
FIG. 13 shows the fluctuation of the rotation speed of the main shaft of FIG. 11.

FIG. 11 is a graph comparing the heat-induced displacement of the main shaft of a machining center estimated by the foregoing method with the actually measured heat-induced displacement of the same main shaft over time. It is seen that the estimation performed during the transient state closely follows the actually measurement. FIG. 12 shows the change in the temperature difference between the main shaft 3 and the bed 4 while the foregoing comparison was made. FIG. 13 shows the change in the rotation speed of the main shaft 3 for the same time period.

Embodiment 2

Figure 14:
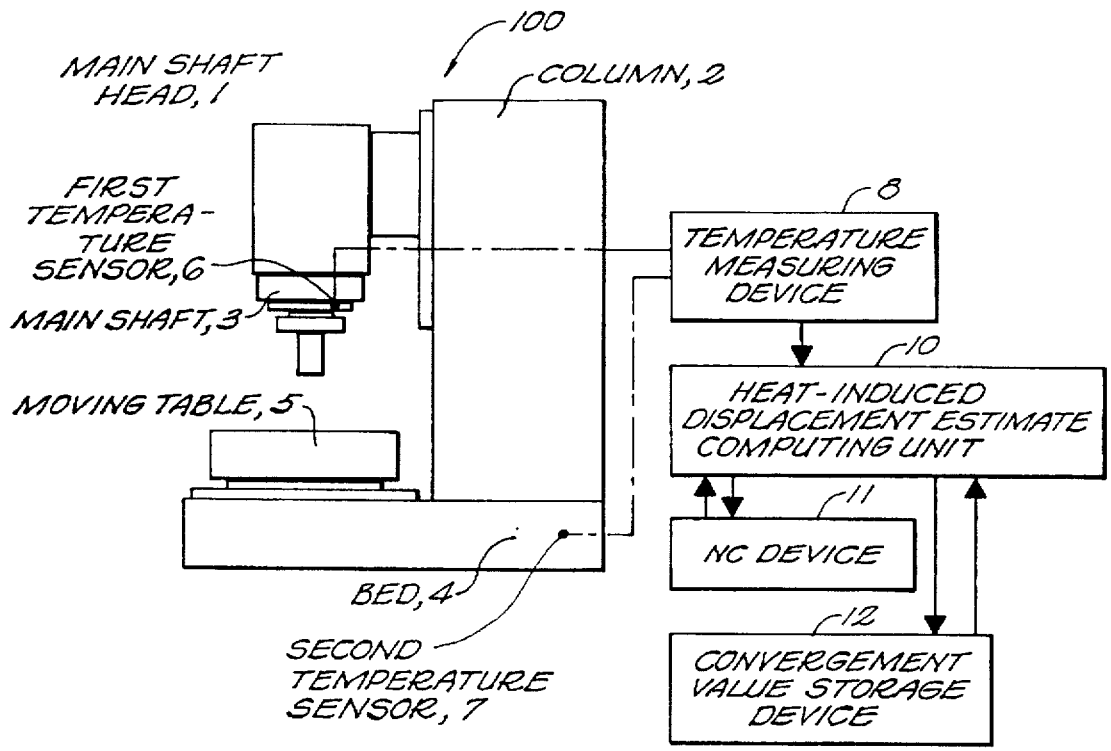
FIG. 14 is a schematic illustration of a heat-induced displacement system for use with a machining center of a second embodiment in accordance with the present invention.

The second embodiment of FIG. 14 is similar to that above described with the exception that it has a convergent value storage device 12 connected to the heat-induced displacement estimate computing unit 10 and that it does not include the temperature recorder 9. The storage device 12 includes memory containing the convergent values of heat-induced displacement of the main shaft 3 corresponding to a range of the rotation speeds of the main shaft 3 while a stationary state is established.

As in the first embodiment, when estimating the heat-induced displacement the computing unit 10 switches between the stationary estimating mode and the transient estimating mode depending on the rotation speed command and the progress of the heat-induced displacement of the main shaft 3 in order. The numerical control device 11 compensates for the heat-induced displacement of the main shaft 3 based on the estimate.

In the operation of the machining center 100, the temperature of the main shaft 3 is measured based on the outputs from the temperature sensors 6 and 7. In a stationary state, in which the temperature of the main shaft 3 is stabilized, the heat-induced displacement of the main shaft 3 is estimated based on the instantaneous temperature measurement. If the rotation speed of the main shaft 3 changes, the transient estimating mode is established, in which the heat-induced displacement of the main shaft 3 is estimated by a special process applied to a transient state.

Figure 15:
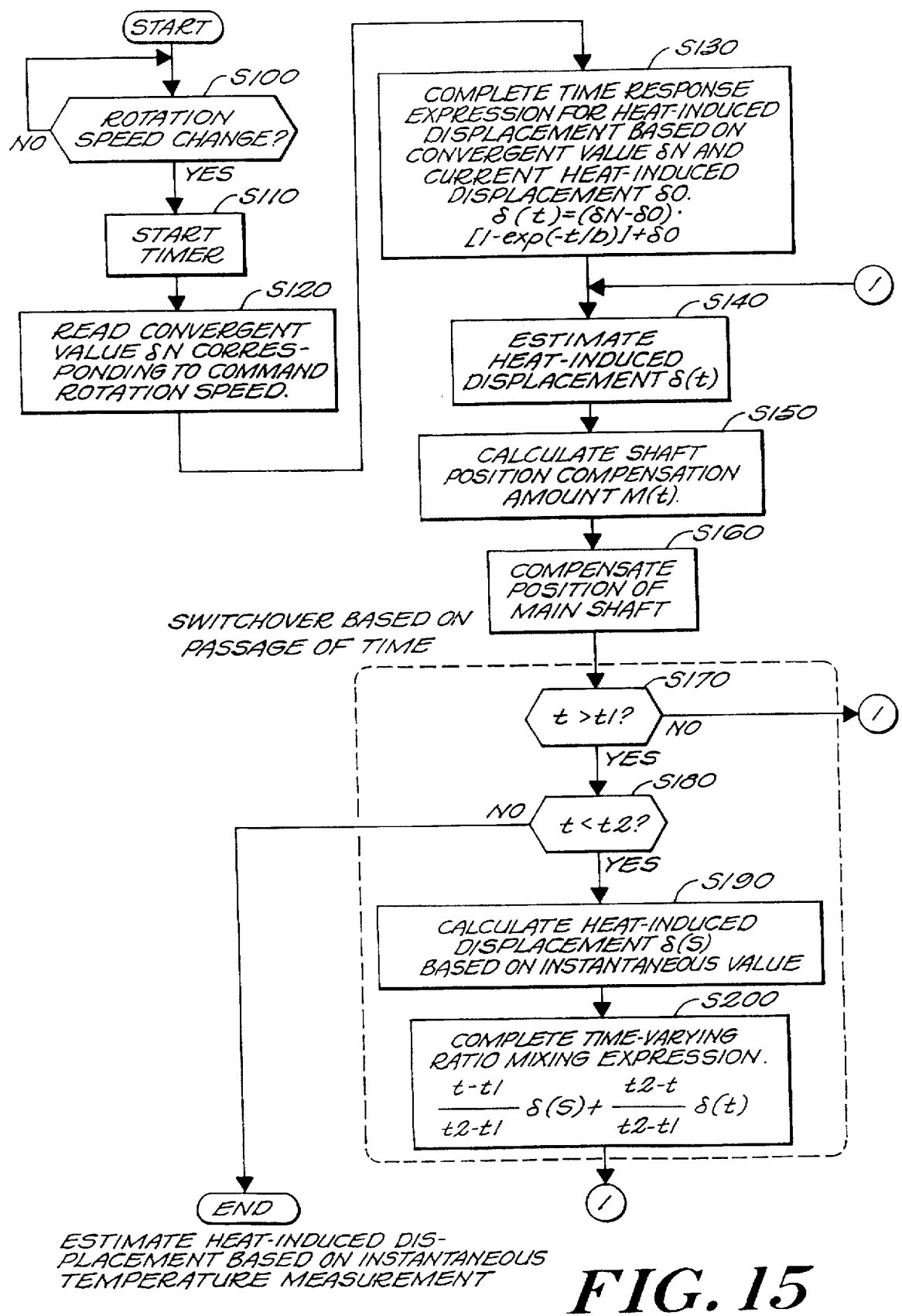
FIG. 15 is a flowchart showing the process carried out by the heat-induced displacement system of FIG. 14.
Figure 17:
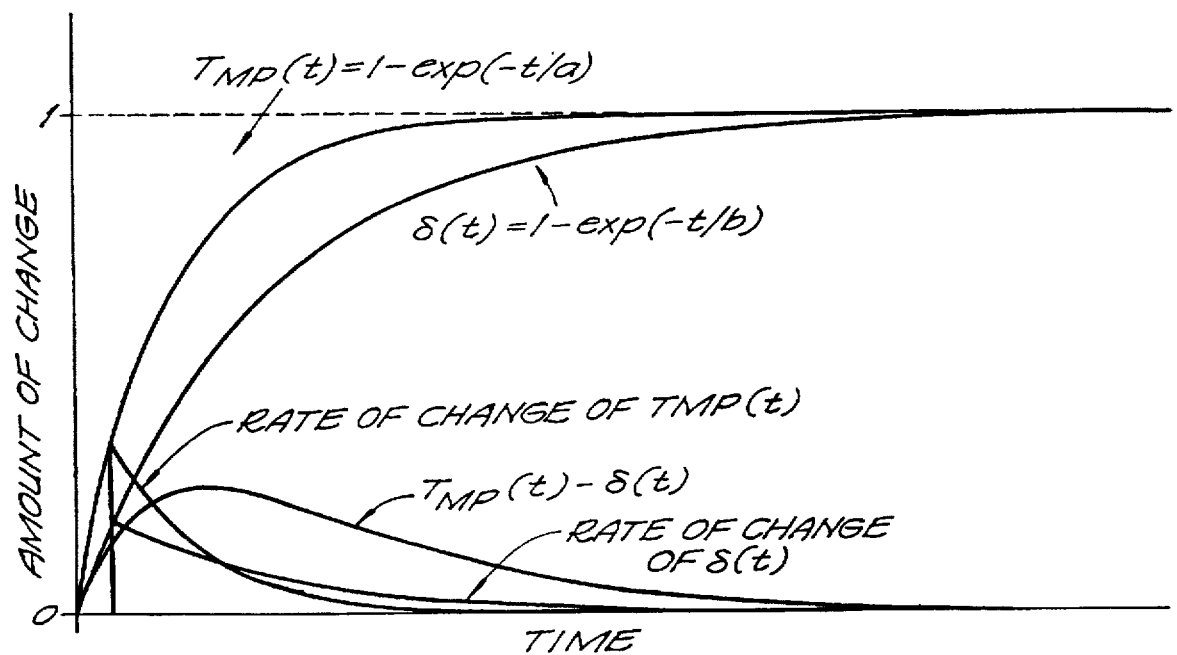
FIG. 17 is a chart illustrating a problem of a conventional method of compensating heat-induced displacement system.

A program flowchart for this special process is shown in FIG. 15 of the drawings. If a change in the rotation speed of the main shaft 3 is detected at step S100, the program proceeds to step S110, at which a timer starts with the time of the change in the rotation speed as the reference time. At step S120, convergent value δn of the heat-induced displacement corresponding to the command rotation speed is read from the storage device 12. At step S130, convergent value δn and the current heat-induced displacement δ0 are substituted into a time response expression for heat-induced displacement (expression (13)). At step S140, the heat-induced displacement amount is estimated by the foregoing expression. At step S150, shaft position compensation amount M (t) is calculated based on this estimate. Then, the program goes on to step S160, where the numerical control device 11 carries out compensation for the position of the main shaft 3.

The transient estimating mode alone is employed until elapsed time t reaches predetermined time t1. At step S 170, it is determined if time t1 has been reached. If NO, the program return to step S 140. If YES at step S 170, the program proceeds to step S180, at which it is determined if time t<predetermined time t2. If YES, the program proceeds to step S190, heat-induced displacement mount δ(s) is estimated based on the instantaneous temperature measurement. It should be noted that from steps S170 to S200 the transient estimating mode is continued along with the stationery estimating mode. At step S200, the estimates according to the foregoing two modes are substituted into the time-varying ratio mixing expression (14). Then, the program returns to step S140 to repeat the subsequent process. If NO at step S180, the transient estimating mode is terminated, so that the heat-induced displacement mount is calculated based only on the instantaneous temperature measurement (in the transient estimating mode).

Figure 16:
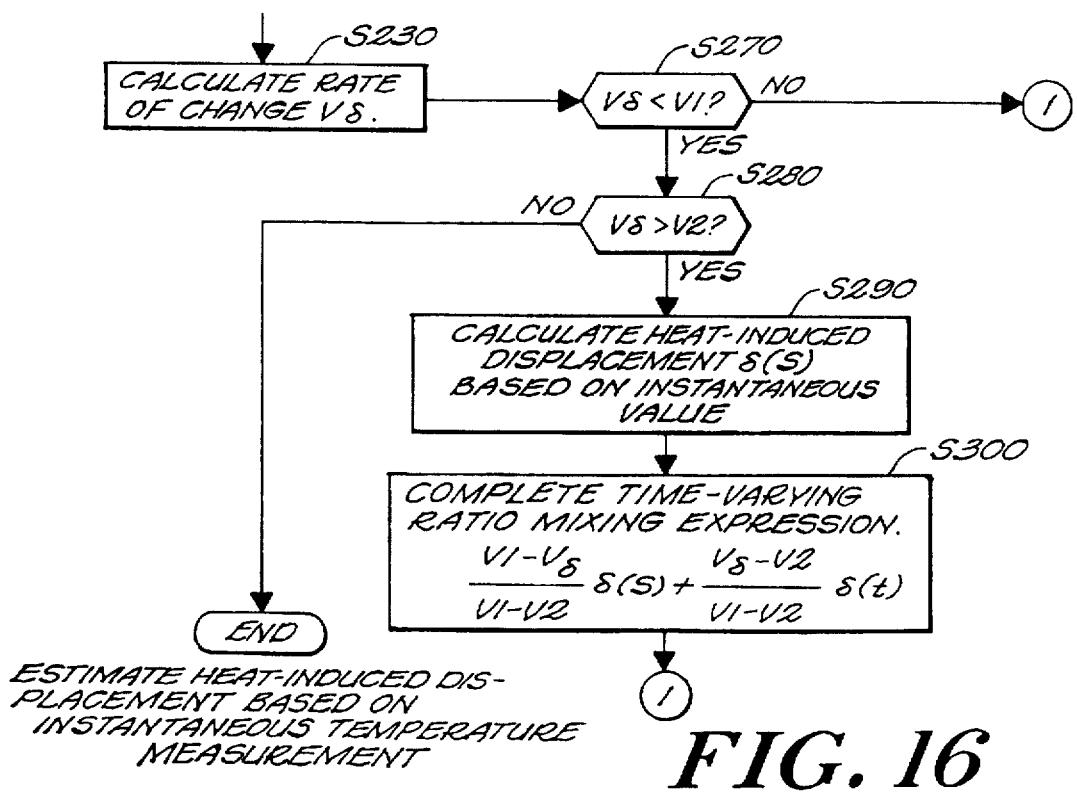
FIG. 16 is a flowchart showing an alternative method of switching two heat-induced displacement processes.

In this embodiment, the switchover between the transient estimating mode and the stationery estimating mode is carried out by the aforementioned method (a). Instead, any of methods (b)–(d) may be employed, such as method (b) as shown in a flowchart of FIG. 16. The current rate of change V δ of the temperature or the heat-induced displacement of the main shaft 3 is calculated at step S230. At step S270 it is determined if V δ<V1. If NO, the program returns to step S140. If YES, the program proceeds to step S280, where it is determined if V δ>V2. If YES, the heat-induced displacement δ(s) is estimated based on the instantaneous temperature measurement at step S290. At step S300, the estimates according to the foregoing two modes are substituted into the time-varying ratio mixing expression (14). Then, the program returns to step 140 to repeat the subsequent process. If NO at step S280, the transient estimating mode is terminated, so that the heat-induced displacement amount is calculated only in the transient estimating mode based on the instantaneous temperature measurement.

As there may be many other modifications, alterations, and changes without departing from the scope or spirit of essential characteristics of the present invention, it is to be understood that the above embodiment is only illustrative and not restrictive in any sense. The scope or spirit of the present invention is limited only by the terms of the appended claims.

For example, the methods of the two embodiments stores data indicative of the temperature of the main shaft 3 in memory whether a transient or a stationary state is established. Instead, such data may be stored while a transient state is established only.

What is claimed is:

1. A method of compensating a component of a machine tool for displacement caused by heat, comprising the steps of measuring the temperature of a component of a machine tool subject to heat deformation based on the output of at least one temperature sensor, estimating the heat-induced displacement of the component based on an instantaneous temperature measurement when the heat-induced displacement is in a stationary state, in which the temperature of the component is stabilized, and estimating the heat-induced displacement based on the relationship between the elapsed time from the beginning of a transient state and measured temperature, when the heat-induced displacement is in a transient state due to a change in the operating condition of the machine tool, and compensating for the heat-induced displacement of the machine tool based on the estimate.

2. A method in accordance with claim 1, wherein the compensation is carried out by a numerical control device.

3. A method of compensating a component of a machine tool for heat-induced displacement, comprising the steps of:

measuring the temperatures of components of a machine tool based on the output of at least one temperature sensor;

storing the temperature measurement as time series data;

estimating the heat-induced displacement of the component based on an instantaneous temperature measurement when the displacement is in a stationary state and the temperature is stabilized, and estimating the heat-induced displacement based on the time series data of the time which precedes the current time by the result of multiplication of the elapsed time by the ratio of the heat-induced displacement time constant to the temperature time constant when the heat-induced displacement is in a transient state due to a change in the operating condition of the machine tool; and compensating for the heat-induced displacement of the machine tool based on the estimate.

4. A method in accordance with claim 3, wherein when the operating condition changes with the heat-induced displacement already in a transient state, the heat-induced displacement amount is obtained by compensating for an estimation error caused by the change.

5. A method in accordance with claim 3, wherein the compensation is carried out by a numerical control device.

6. A method of compensating a component of a machine tool for heat-induced displacement, comprising the steps of:

measuring the temperature of a component of a machine tool based on the output of at least one temperature sensor;

estimating the heat-induced displacement of the component based on an instantaneous temperature measurement when the heat-induced displacement is in a stationary state and the temperature is stabilized, and estimating the heat-induced displacement based on a time response expression containing a heat-induced displacement convergent value corresponding to a command rotation speed of the component, the heat-induced displacement convergent value having been stored in advance; and compensating for the heat-induced displacement of the machine tool based on the estimate.

7. A method in accordance with claim 6, wherein the heat-induced displacement estimation for a stationary state is switched to the heat-induced displacement estimation for a transient state when the heat-induced displacement estimate is substantially the same as the heat-induced displacement convergent value.

8. A method in accordance with claim 7, wherein in switching from the estimation for a transient state to the estimation for a stationary state, the heat-induced displacement amount is given by mixing the values obtained by the estimation for a transient state and the estimation for a stationary state at a time-varying ratio during a predetermined time period and at the expiration of the predetermined time period, the heat-induced displacement amount is calculated based on the value obtained by the estimation for a stationary state alone.

9. A method in accordance with claim 6, wherein the compensation is carried out by a numerical control device.

* * * * *